Figure 1:
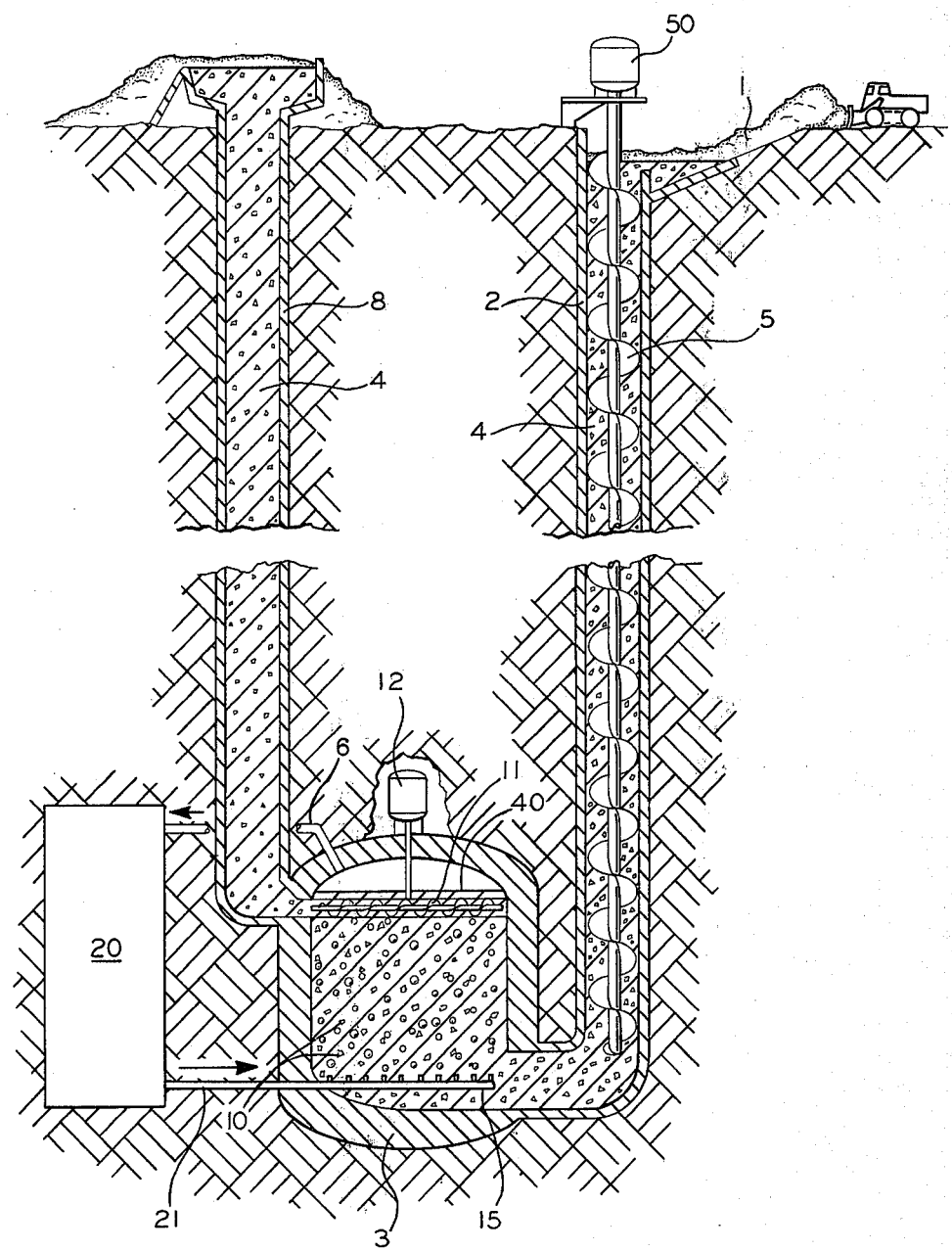

United States Patent [19]

Dick

[11] 4,337,148

[45] Jun. 29, 1982

[54] LEAD PRESSURED EXTRACTION OF CARBONACEOUS MATERIAL

[75] Inventor: James E. Dick, Bartlesville, Okla.

[73] Assignee: Phillips Petroleum Company, Bartlesville, Okla.

[21] Appl. No.: 198,517

[22] Filed: Oct. 20, 1980

[51] Int. Cl.³ .............................................. C10G 1/00
[52] U.S. Cl. ................................ 208/8 LE; 208/8 R; 208/11 LE
[58] Field of Search ................ 208/8 LE, 8 R, 11 LE

[56] References Cited

U.S. PATENT DOCUMENTS

| | | |
|---|---|---|
| 1,251,954 | 1/1918 | Berguis et al. .................... 208/8 LE |
| 2,595,979 | 5/1952 | Pevere et al. ......................... 196/53 |
| 2,955,714 | 10/1960 | Gains .................................... 210/519 |
| 3,474,863 | 10/1969 | Deane et al. .......................... 166/22 |
| 3,533,739 | 10/1970 | Pelczarski et al. ................. 48/92 X |
| 3,558,468 | 1/1971 | Wise ......................................... 208/8 |
| 3,647,379 | 3/1972 | Wenzel et al. ..................... 48/92 X |
| 3,668,120 | 6/1972 | Patterson ............................... 48/92 |
| 3,779,722 | 12/1973 | Tatum ............................. 208/8 R X |
| 3,977,960 | 8/1976 | Stout ............................... 208/8 R X |
| 4,108,760 | 8/1978 | Williams et al. ............... 208/11 LE |

Primary Examiner—Delbert E. Gantz
Assistant Examiner—William G. Wright

[57] ABSTRACT

Molten lead provides the high pressure in a process of solvent extraction of carbonaceous materials.

5 Claims, 6 Drawing Figures

LEAD PRESSURED EXTRACTION OF CARBONACEOUS MATERIAL

This invention relates to the extraction of carbonaceous material from extractable starting material. More specifically the present invention relates to the supercritical extraction of carbonaceous material and a specific means for establishing supercritical conditions during such an extraction.

BACKGROUND OF THE INVENTION

The process of supercritical solvent extraction of carbonaceous materials such as oil shale, tar sand, coal and the like is well known and has received considerable attention in the literature. A major problem in the development of the process is the mechanical feeding of extractable materials, particularly extractable solid materials continuously into a high pressure extraction zone and after extraction the removal of the remaining solids from a high pressure zone.

The Invention

It is one object of this invention to provide a process for extracting carbonaceous materials from extractable starting material.

Another object of this invention is to provide a process for extracting carbonaceous material under supercritical conditions that is both simple and efficient.

A further object of this invention is to provide an extraction process wherein mechanical problems are significantly reduced as compared to presently known procedures.

Another object of this invention is to provide an apparatus for carrying out an extraction process.

Yet a further object of this invention is to provide an extraction process and apparatus for removing carbonaceous materials from extractable starting materials wherein an additional fluid allows efficient conservation of the energy put into the extraction step.

Figure 2:
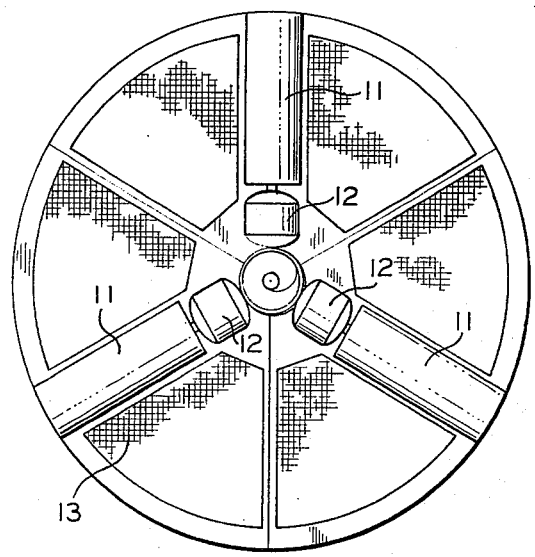
Figure 3:
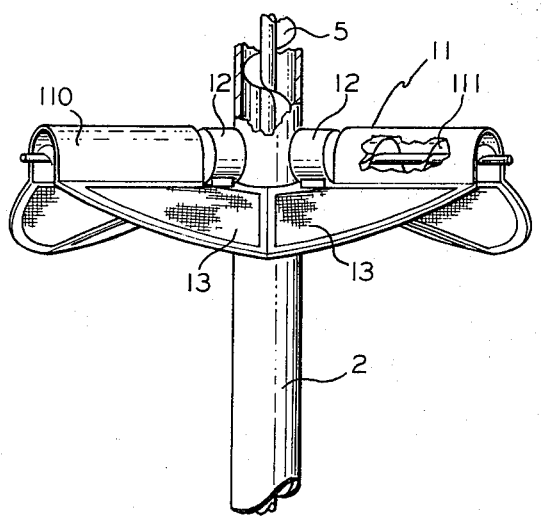
Figure 4:
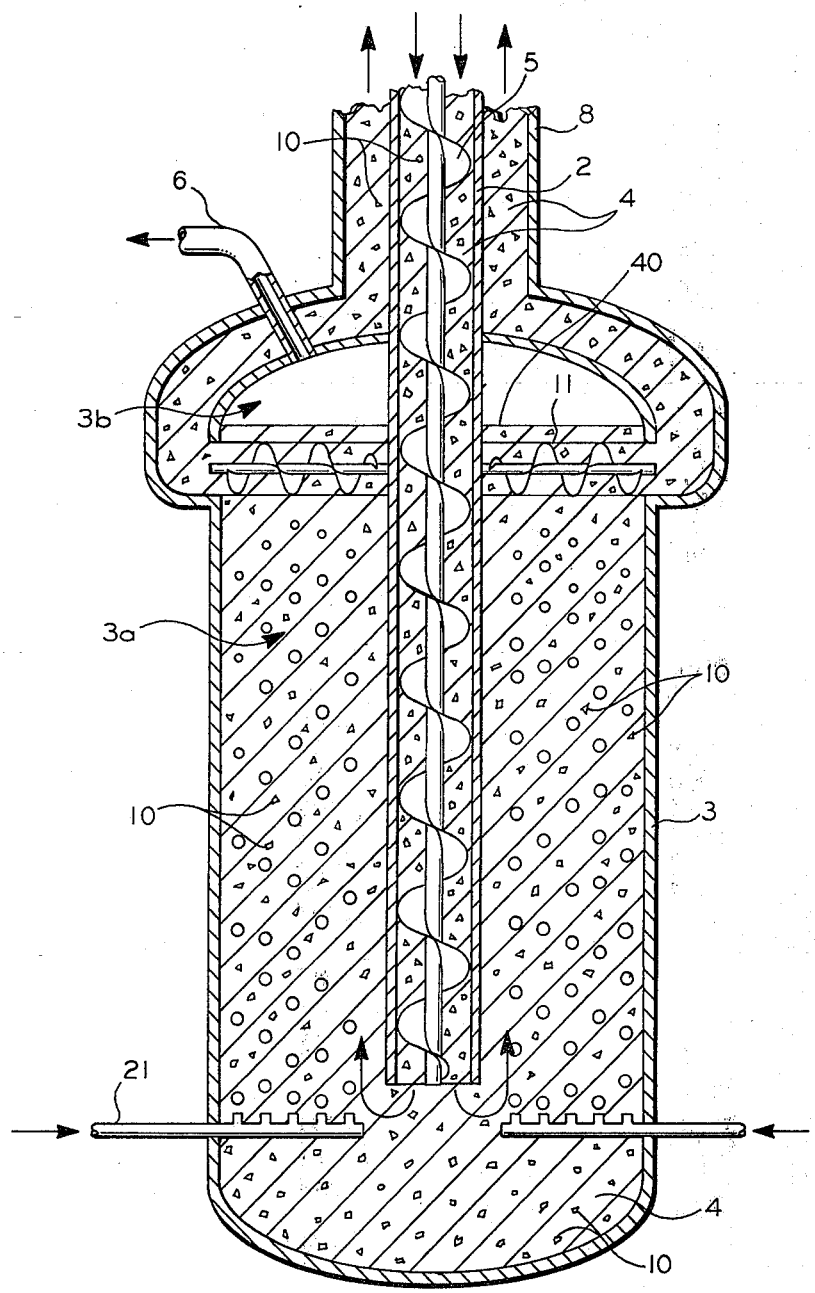

These and other objects, advantages, details, features and embodiments of this invention will become apparent to those skilled in the art from the following description of the invention, the appended claims and the drawing in which FIG. 1 shows a schematic cross sectional view of an apparatus for carrying out the invention, FIGS. 2, 3 and 4 show views of specific embodiments of an extraction zone useful in accordance with this invention.

In accordance with this invention an extraction process is provided wherein the necessary high pressure is generated by the hydrostatic pressure of molten lead.

In accordance with one embodiment of this invention a process for extracting carbonaceous materials from extractable starting materials containing such carbonaceous materials is provided. The extractable starting material is extracted with a solvent under elevated temperature and high pressure conditions in an extraction zone. This high pressure is established by subjecting the starting materials and the solvent in contact with each other to the hydrostatic pressure of molten lead. Preferably, the molten lead is in direct contact with the materials in the extraction zone.

Throughout this specification and the claims the term "extraction" or similar terms refer to both an extraction with essentially no chemical change of the extracted material and to an extraction wherein the solvent and/or the extraction conditions cause a chemical change of the organic material causing it to become soluble, an example for the latter being the conversion of kerogen in oil shale under supercritical extraction conditions into removable hydrocarbon.

More specifically, the process of this invention comprises conveying extractable starting material in contact with molten lead down a hydrostatic inlet channel into an extraction zone. In this extraction zone the extractable starting material is extracted with a solvent resulting in an extract stream comprising the solvent and the carbonaceous material extracted from the extractable starting material as well as extracted starting material. The extract stream is withdrawn from the extracting zone for further processing. The extracted starting material is conveyed from the extraction zone to the lower portion of a hydrostatic outlet channel and is in contact with molten lead from there to the upper portion of the hydrostatic outlet channel. The extracted starting material is then separated from the molten lead.

More specifically, the extractable solids are released from the inlet channel and float in upward direction. The solids may be allowed to float on the lead surface in the extraction zone; or the solids may be maintained in the molten lead (e.g., by a screen); or a partial combination of these two variations may be used, e.g., by holding the floating solids down and partially submerged in the lead by means of a screen. Solvent under supercritical conditions is passed in contact with the extractable solids and an extract is withdrawn from the extraction zone. In yet other terms there are the following main possibilities of establishing phases in the extractor (from top to bottom).

| | | |
|---|---|---|
| (1) | extract fluid | (solvent plus extracted solid materials) |
| | solids | (being in contact with solvent but largely free of lead) |
| | molten lead | (solids floating upwardly in the lead) |
| (2) | extract fluid | |
| | molten lead | (extract fluid bubbling through) |
| | screen | (holding the solids below the screen) |
| | solids | (in contact with lead and solvent) |
| | lead | (solids floating upwardly) |
| (3) | extract fluid | |
| | screen | (holding the solids below the screen) |
| | solids | (free of lead, but in contact with solvent) |
| | solids | (surrounded by lead) |
| | lead | (solids floating upwardly) |

The solvent is introduced into contact with the solids at any location below the top (fluid) layer. Preferably the solvent is introduced into the lowest layer, the liquid lead layer, to allow as long a contact with the extractable solids as possible.

The extractable material is introduced from the top by means of a pressure generating lead column into an extraction zone; the lead, solvent and extractable material constitutes three phases, namely a liquid lead phase, a solid phase (shale, tar sand, extracted shale, extracted sand etc.) and a fluid extract or product phase; the liquid lead phase is the bottom phase in the extraction zone and is in communication with the pressure generating lead columns. The extractable material introduced either floats to the top of the liquid lead phase or is surrounded by the liquid lead phase. The solid phase is in contact with the solvent extracting the solid phase. Above the solid phase the fluid extract or product phase is located; this fluid extract or product phase is withdrawn from the extraction zone essentially free of solids and of lead. The spent or extracted extractable material is passed into a column filled with molten lead to float it back to the top. Thus in the extraction zone a separation is also achieved.

In a preferred embodiment of the process of this invention a level of molten lead is established in the extraction zone and the extractable starting material is introduced into the extraction zone so that this material floats on the molten lead. The remaining floating material after the extract stream has been removed is conveyed from the extraction zone into the lower portion of the hydrostatic outlet channel and back into contact with molten lead.

In accordance with another embodiment of this invention there is provided an apparatus for extracting carbonaceous material from starting material containing such carbonaceous material. The apparatus comprises a hydrostatic inlet channel having a vertical height great enough to establish the pressure at the lower end of the inlet channel for the desired extraction conditions when the channel is essentially filled with molten lead. This inlet channel is constructed to sustain these pressures. In fluid communication with the hydrostatic inlet channel, an extraction zone is provided by the apparatus. In fluid communication with the extraction zone a hydrostatic outlet channel is provided for having a vertical height similarly defined as for the hydrostatic inlet channel. An inlet conduit is provided for adding solvent into contact with extractable starting material to establish a mixture of solvent and extractable starting material in the extraction zone and correspondingly a withdrawal conduit is also provided for withdrawal of an extract stream comprising solvent and extracted carbonaceous material from the extraction zone. Furthermore, inlet conveying means are associated with the inlet channel allowing the movement of extractable starting material through the hydrostatic inlet channel in contact with the molten lead and down into the extraction zone. Preferably the apparatus is also provided with an outlet conveying means which is associated with the extraction zone for conveying extracted starting material in the extraction zone to the lower end of the hydrostatic outlet channel.

One continuous phase of molten lead exists in the inlet channel, the outlet channel and the extraction zone. The solids may (at least in part) leave this continuous phase of liquid lead, but not necessarily. At the end of the extraction the spent solids are in contact with molten lead and floating upwardly to approximately the elevation of introduction.

In accordance with a preferred embodiment of the apparatus the hydrostatic inlet channel and the hydrostatic outlet channel are established by two concentric conduits. The inner conduit establishes one of the channels and the annular space between the inner conduit and the outer conduit establishes the other channel. This embodiment has the advantage that the surface to be insulated is minimized since the temperature differential between the inner and the outer conduit will be small.

It is presently preferred, although not necessary, that the inlet hydrostatic channel and the outlet hydrostatic channel as well as the entire extraction zone are arranged underground. Heating means as well as insulating means are provided for to maintain the surface of both the hydrostatic inlet channel, the hydrostatic outlet channel and the extraction zone at a temperature sufficiently above the melting point of lead to prevent any solidification of the molten lead in the system.

Feed solids, which are considerably less dense than lead, are conveyed through an essentially vertical column of molten lead in the hydrostatic inlet channel to the extraction zone. Extracted solids from the extraction zone are directed to a second column of molten lead in the hydrostatic outlet channel through which the solids float to the surface where they are collected by conventional means for disposal.

The use of molten lead as the hydraulic medium in the process is particularly advantageous, not only because of its high density but also because its melting point (327.5° C.) is suitably below the preferred operating temperature in the extraction zone. Further, since the boiling point of lead is high (1740° C.), its vapor pressure is quite low in the preferred operating temperature range of 330°–550° C.

The invention is preferably carried out as a supercritical extraction of any carbonaceous material; preferably solid carbonaceous material. Examples are naturally occurring starting materials such as oil shale, tar sand, lignite, and coal as well as other extractable materials such as tar or heavy residues from cracking operations. Solids are preferably crushed to a size in the range of 0.5–25 mm for extraction. Preferred extraction conditions are 800–3,000 psi, 330°–550° C., 10–120 minutes residence time and a solvent/feed weight ratio of 1:1 to 30:1. Preferred solvents are aromatic, alicyclic and aliphatic hydrocarbons containing 5 to 6 carbon atoms or mixtures of such solvents. Other useful solvents include those disclosed in U.S. Pat. No. 4,108,760.

FIG. 1 illustrates means for practicing the invention. Crushed oil shale 1 is preheated by means not shown in the drawing. This shale 1 is introduced into the top of the feed column 2 where it is conveyed via a screw conveyor 5 downward to the extraction vessel 3. The screw conveyor 5 is driven by a motor 50. The screw conveyer has openings that are collectively smaller than the mass of particles of the crushed shale introduced. The screw conveyor therefore allows the passage of lead through these openings but essentially prevents the oil shale particles from floating back up. The extraction vessel 3 is preferably located below the surface of the ground, for example in a mine shaft. The feed column 2 is substantially filled with molten lead 4.

The extraction vessel 3 is of suitable dimensions to provide the required residence time for essentially complete extraction of the organic matter from the oil shale. The extraction vessel 3 preferably is a vertically arranged cylindrical vessel. A liquid level 40 of molten lead 4 is maintained in the extraction vessel 3. The oil shale feed is introduced near the bottom of vessel 3 and floats upwardly in the lead. The extractable material is shown by reference number 10.

Supercritical extraction fluid, e.g., toluene, is sparged into the lower part of the vessel 3 via sparge conduit 15 and serves to maintain the molten lead level in the vessel 3 and to contact the incoming oil shale. An extract stream comprising both the supercritical fluid and the carbonaceous material extracted from the oil shale is collected in the upper portion of the vessel 3 and removed via a pressure regulating valve and conduit 6 to a recovery unit 20. In this recovery unit the dissolved carbonaceous material is recovered and the solvent is from there recycled via conduit 21 to the sparger 15.

Extracted oil shale is collected at the top of the shale bed 10 in the extractor and conveyed by auger/expellers 11 driven by a motor 12 into the lower portion of the outlet column 8 which is also filled with molten lead 4. The extracted oil shale floats to the top and there is collected for disposal.

The energy contained in the extracted oil shale as well as some entrained hydrocarbons may be recovered. The oil shale may be passed through a degassing zone in a vessel for purging with an inert gas under slightly higher than atmospheric pressure conditions utilizing, e.g., nitrogen or carbon dioxide. Recovered hydrocarbons may subsequently be separated from the inert gas by common vapor recovery methods. Any lead still clinging to the spent solids may be recovered by separating devices such as a tumbler. Heat loss can be made up by circulating a side stream of the system lead through a heater (not shown).

FIGS. 2, 3 and 4 of the drawing show a specific embodiment of an extraction vessel with the outlet conveying means. In this embodiment the feed column 2 and the outlet column 8 are arranged coaxially. Heat losses are thereby minimized. The fresh oil shale is introduced through the inner conduit 2 by means of the screw conveyor which as described above may be a perforated screw conveyor essentially preventing any conveyance of molten lead. In another embodiment the screw conveyor 5 will be a standard screw conveyor and the molten lead is circulated in a loop type operation.

The cylindrical extraction vessel is separated into two portions by a screen comprising in this special example 6 sections 13, a lower portion 3a and an upper portion 3b. The screen sections 13 are inclined in such a manner that the oil shale 10 moves along the screen and into auger expellers 11. The solvent together with the extracted carbonaceous material as well as lead (if any) passes through the screen sections 13 and into the upper portion 3b of vessel 3. From there the extract stream is withdrawn via conduit 6. The level 40 of liquid lead is here also above the screen and in the portion 3b.

The auger expellers 11 comprise an essentially cylindrical housing 110. Inside of this housing a screw-type auger 111 is rotatably arranged. Each screw type auger is rotated by a motor 12. The screw type expeller 111 advances spent oil shale from the lower section 3a of the extraction vessel 3 into the annular outlet channel formed between the outer conduit 8 and the inner conduit 2. This annular channel is also filled with molten lead 4. The spent oil shale 10 then floats in this channel back to the surface where it is withdrawn as described.

In accordance with a further embodiment of this invention the extraction zone established in the extraction vessel comprises two sections located laterally or horizontally at different locations in the extraction vessel. The inlet channel allows the introduction of extractable solids into the first section. The arrangement is such that the spent solids flow (or overflow) laterally into the second section. This section is in contact with the intake side of the outlet conveyor means. The inlet conduit is preferably arranged for permitting solvent introduction in the lower part of the first section. The extract is withdrawn via a conduit from the top section of the extraction vessel.

Figure 5:
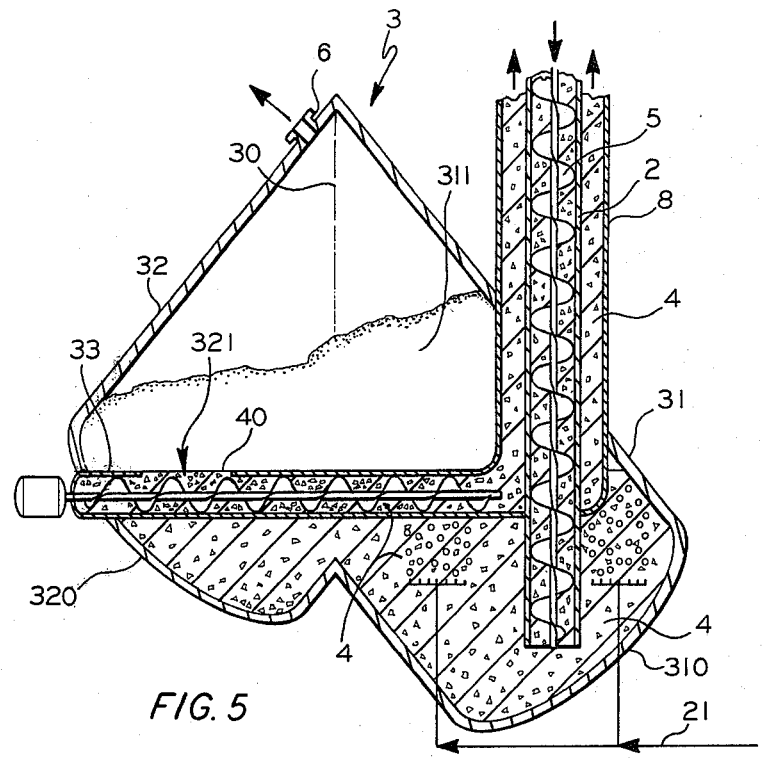

FIG. 5 shows another embodiment for an apparatus for carrying out the process of this invention. Similar to FIG. 4, the shale is introduced into the chamber 3 for supercritical extraction by means of an auger 5 operating in a conduit 2 that is filled with molten lead. The openings in the auger 5 are the same as described in connection with other embodiments. The shale to be supercritically extracted is introduced into the extraction chamber 3 at the lower end of the conduit 2. The shale to be extracted floats upward in bed 4 consisting essentially of molten lead. The level 40 of molten lead is such that a continuous molten lead phase exists between the inlet channel 2 outlet and channel 8. Into this bed of molten lead the solvent is introduced via line 21. The solvent is under supercritical conditions of pressure and temperature.

The extraction chamber 3 comprises two sections 31 and 32 which are standard preferably cylindrical vessels. These two sections are connected so that the axis of the two sections intersect at an angle of approximately 45° to 135°. The two chamber sections 31 and 32 are each joined with respect to the vertical so that bottom section 310 and respectively 320 of the two chamber sections 31 and 32 are situated at the lower proximity of the apparatus with the seam joining sections 31 and 32, line 30, oriented vertically. The two sections 31 and 32 of the extraction chamber 3 can be described as an "in process section" 31 and a "spent shale section" 32. The shale floating on the molten lead in the general area 311 is in the process of being supercritically extracted. The extract consisting essentially of the solvent under supercritical conditions and the dissolved product from the shale is withdrawn via conduit 6. The extracted or spent shale overflows into the area 321. From this area the spent or extracted shale is removed at the lowest portion of the bottom section 320 by means of an expeller 33 which feeds the spent shale by means of an auger into the annular shaped channel confined between conduits 2 and 8. This channel is filled with molten lead 4. The spent shale floats upward and is—after an optional clean up step for removing any entrained lead—disposed of. The auger in the expeller 33 is of similar construction as auger 5, i.e., the auger also is perforated to allow the back flow of molten lead.

It constituted a significant advantage of this invention that several process steps and parameters are carried out or respectively achieved in the extraction chamber 3. First, the column of molten lead generates the very high pressure necessary for supercritical extraction in the chamber. Second, the extract, the spent shale and the molten lead are easily separated in the extraction chamber 3: the shale which is in the process of being supercritically extracted readily floats on the molten lead, the extract leaves the shale as a fluid entraining essentially no solids, and the spent shale is essentially free of extract and solvent and is conveniently conveyed back to the surface by letting the spent shale float upward in the molten lead.

The pressure in the separation and extraction chamber 3 in the gas dome or top section is maintained high enough to prevent excess molten lead from flowing from the channels into the chamber. Thereby the level 40 of molten lead is essentially not altered during the process.

Figure 6:
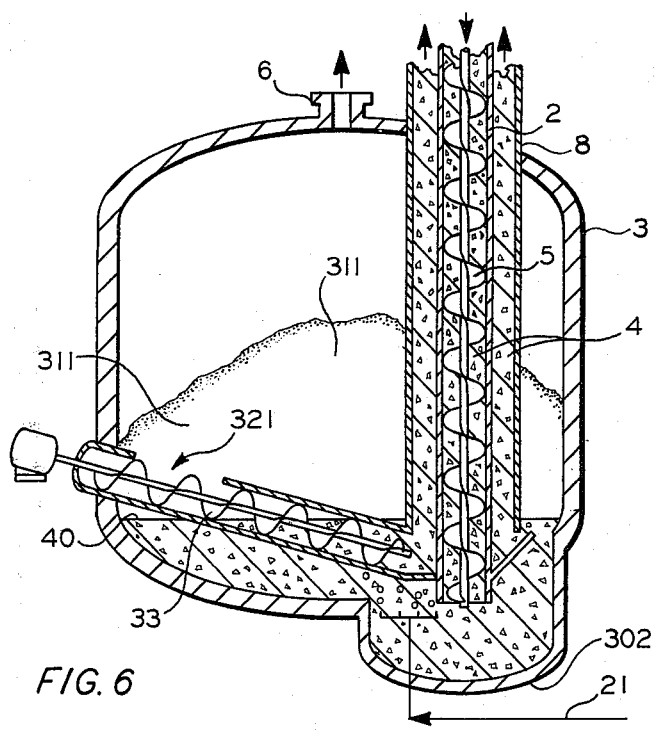

FIG. 6 shows another embodiment of the apparatus. Shale is introduced via auger 5 and bottom area 302 into the chamber 3. Shale floats on the lead 4 and is supercritically extracted by solvent introduced through line 21 under supercritical conditions.

An auger 33 removes spent shale from the side of chamber 3 opposite to the location of introduction and feeds the spent shale into the annular outlet channel between conduits 2 and 8. Extract is withdrawn from the chamber 3 via line 6.

The following is a calculated example to illustrate a typical operation.

EXAMPLE

A 50,000 bbl/day shale oil plant utilizes about 70,000 tons/day of Colorado oil shale containing 30 gal/ton of shale oil in the form of kerogen. The feed is crushed to about 8-20 mesh size (0.8-2.4 mm), preheated to about 330° C. by contacting with hot flue gas and introduced into the top of the 3½-ft. diameter feed column where it is carried downward by an auger conveyor through a 340-foot depth of molten lead which is maintained at a temperature of 400° C. This head of molten lead is sufficient to achieve and maintain the extraction zone pressure of 1500 psia. The feed passes into the extraction zone where it rises through a 3-4-foot depth of molten lead and collects as a 30-foot deep bed in the 10-foot diameter extractor. Residence time of the shale in the extractor is about 15 minutes. Toluene solvent at a rate of 7300 GPM is pumped through a solvent heater and sparged into the molten lead in the bottom of the extractor at extractor conditions of 400° C. and 1500 psia. Supercritical solvent containing dissolved shale oil is removed from the top of the extractor via a pressure regulating valve to conventional recovery facilities; recovered solvent is recycled to the extractor. Extracted oil shale is removed from the top of the bed via solids expellers to the discharge column where the spent shale rises through a 2½-foot diameter column of molten lead to the surface where it is purged with flue gas at slightly above atmospheric pressure to remove entrained solvent. The spent shale then is discarded. Solvent is recovered from the flue gas by adsorption and/or condensation in heat recovery facilities.

Reasonable variations and modification which will become apparent to those skilled in the art can be made in this invention without departing from the spirit and scope thereof.

I claim:

1. A process for extracting carbonaceous materials from extractable starting materials containing such carbonaceous material using a solvent under elevated temperature and high pressure conditions in a system including an extraction zone said process comprising
   subjecting said starting materials and solvent in contact with each other to the hydrostatic pressure of molten lead in order to establish said high pressure in said extraction zone by said molten lead and maintaining the lead in said system at a temperature sufficiently above its melting point to prevent solidification of the lead in the system.

2. A process in accordance with claim 1 wherein said molten lead is in direct contact with said materials in said extraction zone.

3. A process in accordance with claim 1 comprising
   (a) conveying extractable starting material in contact with molten lead down through a hydrostatic inlet channel into said extraction zone,
   (b) introducing said solvent into said extraction zone and into contact with said extractable starting material,
   (c) withdrawing an extract stream comprising solvent and carbonaceous material extracted from said extractable starting material from the extraction zone for further processing,
   (d) conveying extracted starting material from said extraction zone to the lower portion of a hydrostatic outlet channel and in contact with molten lead from there to the upper portion of said hydrostatic outlet channel,
   (e) separating said extracted starting material from said molten lead.

4. A process in accordance with claim 3 comprising carrying out said extraction under supercritical conditions.

5. A process in accordance with claim 4 comprising
   (a) continuously moving extractable starting material through said molten lead in said hydrostatic inlet channel to said extraction zone essentially without conveying additional molten lead into said extraction zone,
   (b) floating said extractable starting material in contact with said solvent on molten lead in said extraction zone,
   (c) withdrawing said extract stream from the floating extracted starting material and from the extraction zone leaving a remaining floating material,
   (d) conveying remaining floating material from said extraction zone to said lower portion of said hydrostatic outlet channel.

* * * * *